Oct. 16, 1928.
F. M. WEBB
1,687,744
RECIPROCATING ENGINE
Filed Dec. 23, 1925    2 Sheets-Sheet 1
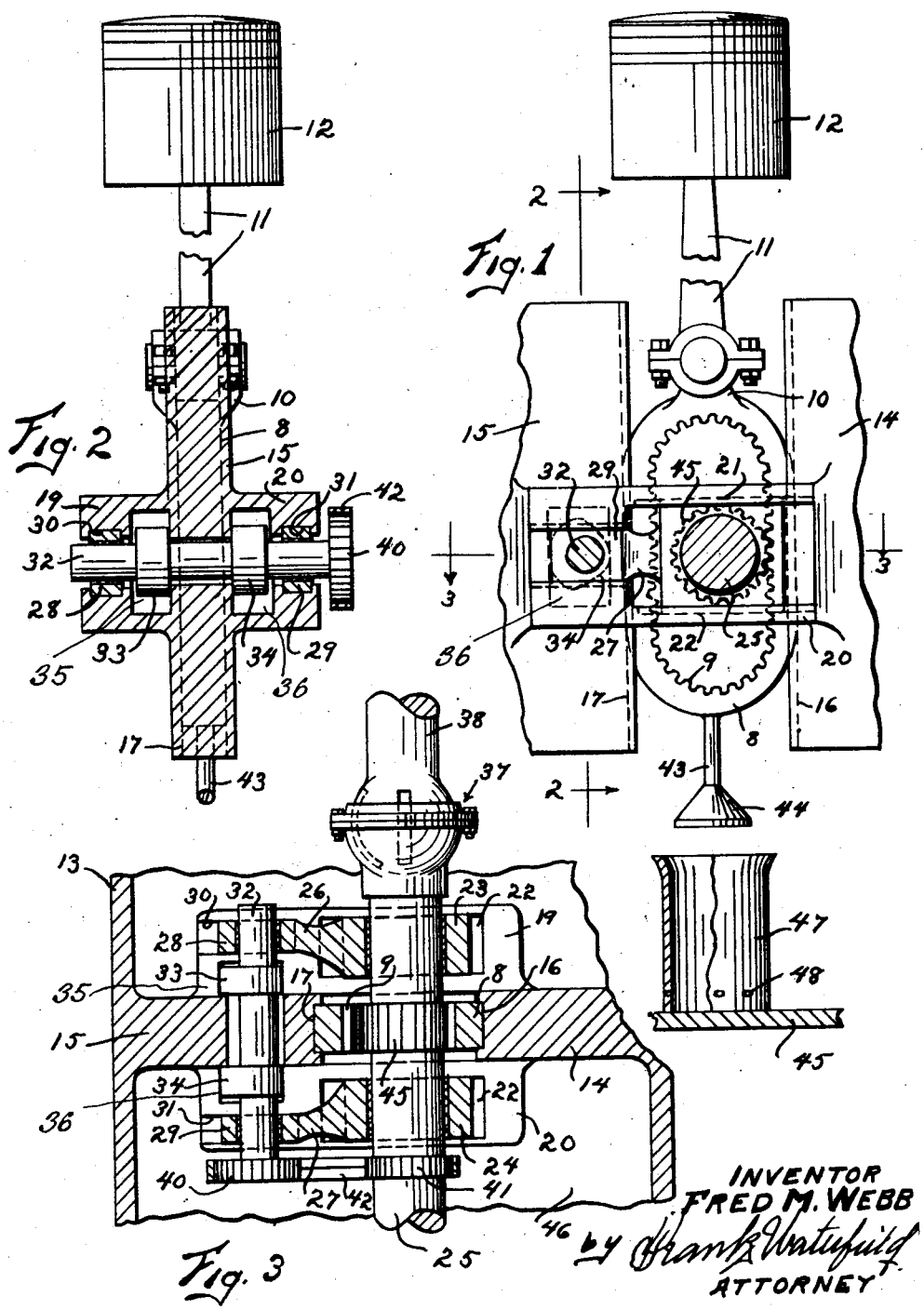
INVENTOR
FRED M. WEBB
by Frank Winterfield
ATTORNEY

INVENTOR
FRED M. WEBB
ATTORNEY

Patented Oct. 16, 1928.

1,687,744

UNITED STATES PATENT OFFICE.

FRED MAURICE WEBB, OF FRESNO, CALIFORNIA.

RECIPROCATING ENGINE.

Application filed December 23, 1925. Serial No. 77,190.

My invention relates to reciprocating engines of any type and the object thereof is to provide improved mechanism for transforming the reciprocatory motion of the piston into a rotating motion whereby the power and efficiency is increased and at the same time the rotative speed of the driven member or shaft will be increased relative to the piston speed.

Another object is to provide mechanism of the above character which will be simple in construction, effective in operation, and which can be substituted for the mechanism now in use.

Other objects and advantages will appear hereinafter and, while I have shown and will describe the preferred form of my invention, it will be understood that I do not limit myself to such preferred form, but that various changes and adaptations may be made therein without departing from the spirit of my invention.

In the drawings accompanying and forming a part hereof:

Fig. 1 is a side elevation of so much of an explosion engine as is necessary to illustrate my invention.

Fig. 2 is a section on the line 2—2 of Fig. 1.

Fig. 3 is a section on the line 3—3 of Fig. 1.

Figure 4:
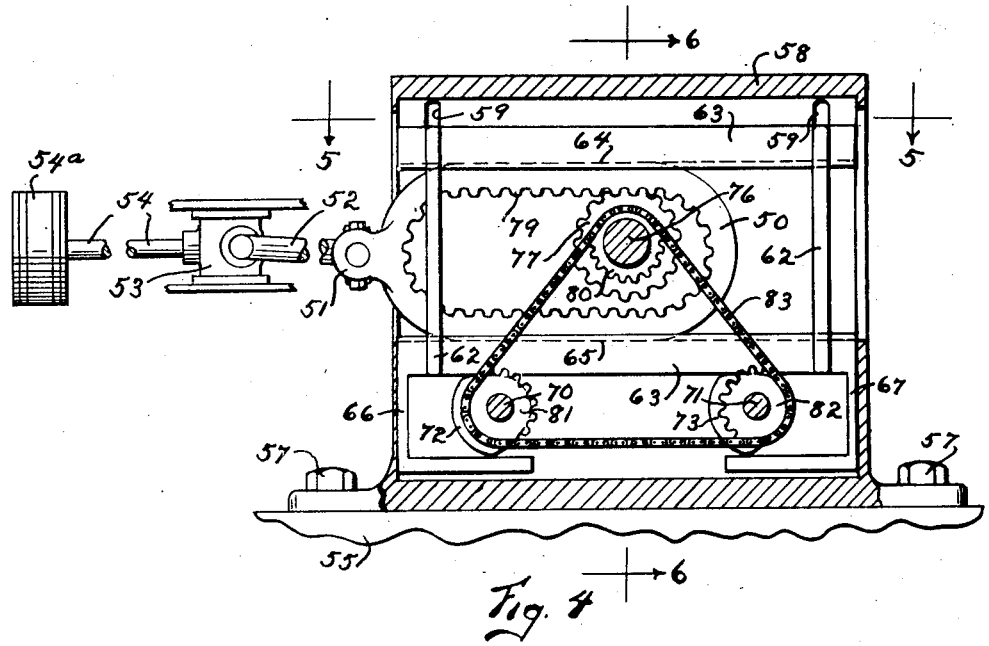
Fig. 4 is a side elevation of my device as adapted for a steam engine.

Referring to the drawings (Figs. 1 to 3 inclusive) my invention comprises a driving member 8, substantially oval in shape on the inner periphery of which are provided gear teeth 9. The upper end of member 8 has projecting therefrom an ear 10 to which is pivotally connected the lower end of the piston rod 11.

Rod 11 is connected to the piston 12 rigidly or by a wrist pin (not shown) in the usual well known manner. Ear 10 may also be omitted if desired and the connecting or piston rod, piston and driving member 8 formed integrally. Extending inwardly towards each other from the side walls of the crank case 13 of the engine are partition walls 14 and 15 and in these walls, in opposed relation are provided grooves 16 and 17 in which member 8 is slidably mounted to slide vertically. Extending outwardly from opposite side of partitions 14 and 15 are brackets 19 and 20 and in these brackets are provided guideways 21 and 22 in which are slidably mounted the shaft bearings 23 and 24, in which bearings is revolubly mounted the driven shaft 25. Projecting from one side of the bearings 23 and 24 are arms 26 and 27 upon the free ends of which are secured the cam shaft bearings 28 and 29. Bearings 28 and 29 are slidably supported in guideways 30 and 31 provided in brackets 19 and 20 in alinement with the guideways 21 and 22. Rigidly mounted upon cam shaft 32 are cams 33 and 34 the faces of which bear against the sides of the recesses 35 and 36 provided in brackets 19 and 20 so that as cam shaft 32 is rotated said cams will act to reciprocate bearings 24 and 23, and bearings 28 and 29, with their respective shafts in a horizontal plane. Mounted upon each end of shaft 25 are universal or flexible joints 37 which are in turn connected to the power shaft 38, in the case of a single cylinder engine, but in the case of a multiple cylinder engine the shafts 25 will be interconnected similarly. Rigidly mounted upon shaft 32 at one end thereof is a sprocket wheel 40 and a similar wheel 41 is rigidly mounted upon the driven shaft 25, a chain 42 passing around these sprocket wheels provides means for rotating said shafts 32 and 25 in unison. Extending downwardly from the lower end of member 8 is a stem 43 the lower end of which terminates in a head 44, and mounted upon the bottom wall 45 of the oil pan 46 is an oil cup 47 into which head 44 is adapted to plunge during the reciprocation of member 8. Holes 48 are provided in the lower portion of the outer wall of cup 47 through which the oil enters said cup, check valves (not shown) being provided if desired and as member 8 reciprocates downwardly head 44 will be projected into said cup, and due to the fact that the said head is somewhat smaller in diameter than the cup, will force the oil out of said cup past said head and spray the same upwardly thereby lubricating the mechanism.

In the operation of this form of my device, as the piston travels downwardly (Fig. 1) the teeth of member 8 will be in engagement with the teeth of gear 45, rigidly mounted upon shaft 25 rotating the same in a clockwise direction. At the same time rotation will be imparted to cam shaft 32 the rotation of which will rotate cams 33 and 34. Cams 33 and 34 are so designed as to harmonize with the interior configuration of member 8 and to reciprocate shaft 25 so as to keep the teeth 9 and the teeth of gear 45 in operative engagement at all times and as member 8 approaches the end of its stroke in either direction the shaft 25 will be reciprocated to follow the curve at the ends thereof.

Figure 5:
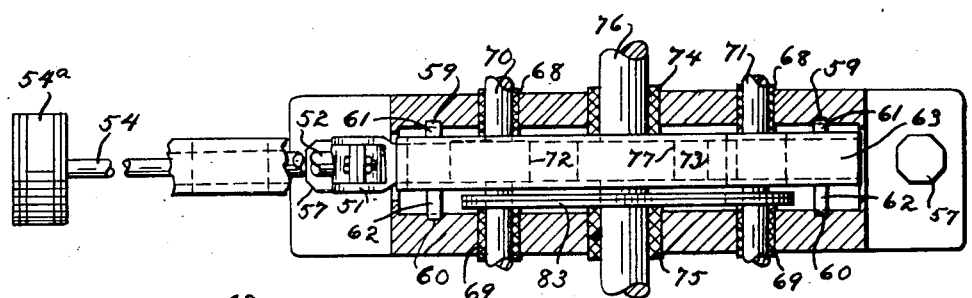
Fig. 5 is a section on the line 5—5 of Fig. 4.
Figure 6:
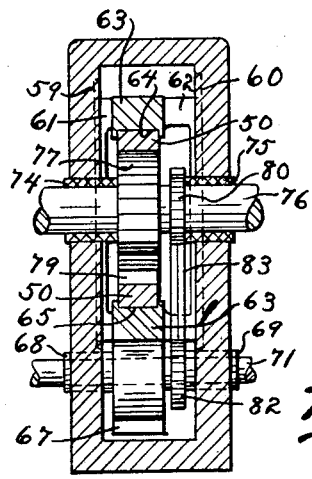
Fig. 6 is a section on the line 6—6 of Fig. 4.

Referring to Figs. 4, 5 and 6 my driving member 50 is similar in shape to member 8 and is positioned to reciprocate horizontally. Extending outwardly from one end of member 50 is an ear 51 which is connected to one end of a connecting rod 52. The other end of rod 52 is connected to the usual cross head 53. Cross head 53 is connected to the piston stem 54 in the usual well known manner.

Mounted upon a suitable bed plate 55 by means of bolts 57 is an upstanding frame 58 and in this frame is provided vertical guideways 59 and 60 adapted for the reception of the guide pins 61 and 62 projecting from opposite sides of the driving member supporting frame 63. Formed in the opposed faces of the driving member supporting frame are guideways 64 and 65 and in these guideways is mounted the driving member 50 slidable horizontally.

Extending downwardly and inwardly from each end of member 63 are substantially L-shaped brackets 66 and 67 and provided in the walls of frame 68 at each end and near the bottom thereof are bearings 68 and 69 and in these bearings are revolubly mounted the cam shafts 70 and 71 upon which are rigidly mounted the cams 72 and 73. Cams 72 and 73 are so mounted upon shafts 70 and 71 as bear against the lower face of supporting frame 63 and the upper faces of brackets 66 and 67 so that as said cams are rotated frame 63 will be reciprocated vertically. Provided in the side walls of frame 58 about centrally thereof are bearings 74 and 75 in which bearings is rotatably mounted the driven shaft 76. A gear 77 is rigidly mouned upon shaft 76 and is adapted for operative engagement with the teeth 79 of driving member 50. Rigidly mounted upon shaft 76 at the side of gear 77 is a sprocket wheel 80 and similar wheels 81 and 82 are rigidly mounted upon the cam shafts 70 and 71, a chain 83 passing around these sprocket wheels serving to rotate the same in unison.

In the operation of this form as the member 50 is reciprocated by the reciprocation of the piston 84 it will, through the operative engagement of the teeth 79 with the teeth of gear 77, rotate shaft 76. The rotation of shaft 75 will in turn rotate cam shafts 70 and 71 causing the cams 72 and 73 to alternately raise and lower supporting frame 63, it being understood that these cams are so designed and arranged as to always maintain the operative engagement between teeth 79 and the teeth of gear 77. Any suitable lubricating mechanism may be employed with this form of my device.

Having described my invention what I claim is:

1. The combination with a reciprocating engine, of an elongated endless rack secured to the engine piston, a pinion on the power shaft in engagement with said rack, a stationary frame, a movable frame mounted in said stationary frame to move vertically, guideways carried by said movable frame for supporting said rack, said rack being slidable in said frame, a shaft mounted in said stationary frame at each end thereof beneath said movable frame, a cam mounted on each of said shafts adapted to bear against the underside of said movable frame to raise and lower the same, and operative connections between said last shafts and said power shaft adapted to rotate the same synchronously.

2. The combination with a reciprocating engine of an elongated endless rack secured to the engine piston, a pinion on the power shaft engageable with the rack, a vertically movable frame in which said rack is slidably mounted, and means operated by said power shaft adapted to raise and lower said movable frame to hold the pinion and rack in engagement and to shift the rack to engage opposite sides of the pinion at the end of the stroke.

3. The combination with a reciprocating engine of an elongated endless rack secured to the engine piston, a pinion on the power shaft in operative engagement with said rack, a vertically movable frame in which said rack is slidably mounted, a pair of cam shafts mounted beneath said movable frame, one at each end thereof parallel with said power shaft, a cam track at each end of said movable frame through which said cam shaft passes, a cam on each of said cam shafts adapted to maintain operative engagement between said rack and pinion to effect continuous motion of the pinion in the same direction and an operative connection between said power and cam shafts whereby said shafts are caused to rotate in unison.

In witness that I claim the foregoing I have hereunto subscribed my name this 28th day of November 1925.

FRED MAURICE WEBB.